US010303639B2

(12) United States Patent
Bartley et al.

(10) Patent No.: US 10,303,639 B2
(45) Date of Patent: May 28, 2019

(54) SECURE CRYPTO MODULE INCLUDING OPTICAL GLASS SECURITY LAYER

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Chatfield, MN (US); Mark J. Jeanson, Rochester, MN (US); Mark O. Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 15/862,104

(22) Filed: Jan. 4, 2018

(65) Prior Publication Data

US 2018/0145755 A1    May 24, 2018

Related U.S. Application Data

(62) Division of application No. 15/080,120, filed on Mar. 24, 2016.

(51) Int. Cl.
*H04L 29/00*    (2006.01)
*G06F 13/40*    (2006.01)
*G09C 1/00*    (2006.01)
*H04L 9/00*    (2006.01)
*H04B 10/80*    (2013.01)

(52) U.S. Cl.
CPC .......... *G06F 13/4068* (2013.01); *G09C 1/00* (2013.01); *H04B 10/80* (2013.01); *H04L 9/004* (2013.01)

(58) Field of Classification Search
CPC .............. H04B 10/2587; G06F 13/4068; H04L 9/0852
USPC .......................................................... 380/256
See application file for complete search history.

(56) References Cited

U.S. PATENT DOCUMENTS

| | | | | |
|---|---|---|---|---|
| 4,278,837 | A * | 7/1981 | Best ................. | G06F 12/1408 200/61.08 |
| 4,598,274 | A * | 7/1986 | Holmes ............... | G08B 13/04 340/550 |
| 5,169,707 | A | 12/1992 | Faykish et al. | |
| 5,319,475 | A | 6/1994 | Kay et al. | |
| 7,065,656 | B2 | 6/2006 | Schwenck et al. | |
| 7,296,299 | B2 | 11/2007 | Schwenck et al. | |
| 7,488,954 | B2 | 2/2009 | Ross et al. | |
| 7,952,478 | B2 | 5/2011 | Bartley et al. | |
| 8,659,908 | B2 | 2/2014 | Adams et al. | |

OTHER PUBLICATIONS

List of IBM Patents or Patent Applications Treated as Related, dated herewith.

* cited by examiner

*Primary Examiner* — Anthony D Brown
*Assistant Examiner* — Michael D Anderson
(74) *Attorney, Agent, or Firm* — ZIP Group PLLC

(57) ABSTRACT

A method of fabricating a printed circuit board (PCB) is presented. The PCB includes a glass security layer. The method includes forming the glass security layer upon a PCB wiring layer. The method includes optically attaching an optical electromagnetic radiation (EM) emitter upon the glass security layer. The method includes optically attaching an optical EM receiver upon the glass security layer. The method further includes electrically connecting an optical monitor device to the optical EM receiver.

6 Claims, 8 Drawing Sheets

SECURE CRYPTO MODULE INCLUDING OPTICAL GLASS SECURITY LAYER

FIELD OF THE INVENTION

Embodiments of the invention generally relate to computer systems and more particularly to computer systems that have a secure crypto module including a glass security layer that transfers optically visible electromagnetic radiation (EM).

DESCRIPTION OF THE RELATED ART

A cryptographic module is a set of hardware, software, firmware, or some combination thereof that implements cryptographic logic or cryptographic processes, including cryptographic algorithms, and is contained within the cryptographic boundary of the module. U.S. Government Federal Information Processing Standard (FIPS) 140-2 Security Requirements for Cryptographic Modules-(Level 4) is a standard that specifies security requirements for cryptographic modules. This standard requires that physical security mechanisms provide a complete envelope of protection around the cryptographic module with the intent of detecting and responding to all unauthorized attempts at physical access.

A non-exhaustive list of a cryptographic modules is as follows: cryptographic coprocessor, cryptographic accelerator, cryptographic adapter card, cryptographic field programmable gate array (FPGA), memory storing cryptographic accelerator data, etc.

In a particular example of a cryptographic module, a cryptographic coprocessor is a secure cryptoprocessor that performs cryptographic operations used by application programs and by data handling operations, such as SSL (Secure Sockets Layer) private key transactions associated with SSL digital certificates. The cryptoprocessor includes a tamper-responding hardware security module that provides secure storage for storing crypto keys and other sensitive data. Cryptoprocessor applications may include financial PIN (Personal Identification Number) transactions, bank-to-clearing-house transactions, EMV (Europay®, Master-Card®, and Visa®) transactions for integrated circuit (chip) based credit cards, basic SET (Secure Electronic Transaction) block processing, and general-purpose cryptographic applications using symmetric key, hashing, and public key algorithms. The crypto keys may be generated in the cryptoprocessor and may be saved in a keystore file encrypted under a master key of that cryptoprocessor.

In another particular example of a cryptographic module, a cryptographic adapter card includes a printed circuit board that may be plugged into a computer system motherboard. The cryptographic adapter card includes a secure crypto module that contains and generally forms a boundary to one or more other cryptographic modules contained therein forming the envelope of protection around the one or more other cryptographic module(s). Secure crypto modules typically include tamper sensors that detect and respond to unauthorized attempts at physical access.

SUMMARY

In an embodiment of the present invention, method of fabricating a printed circuit board (PCB) is presented. The PCB includes a glass security layer. The method includes forming the glass security layer upon a PCB wiring layer. The method includes optically attaching an optical electromagnetic radiation (EM) emitter upon the glass security layer. The method includes optically attaching an optical EM receiver upon the glass security layer. The method further includes electrically connecting an optical monitor device to the optical EM receiver.

These and other embodiments, features, aspects, and advantages will become better understood with reference to the following description, appended claims, and accompanying drawings.

DETAILED DESCRIPTION

A glass security layer is located upon or within a printed circuit board (PCB). The PCB is utilized by a cryptographic adapter card that includes one or more secured crypto components that carry out cryptographic data handling functions. The glass security layer may be located upon a PCB of the crypto adapter card and/or upon a daughter PCB within a secure crypto module upon the crypto adapter card. The crypto adapter card may be installed within a computer system that performs cryptographic functions utilizing one or more secured crypto components. The glass security layer may generally identify an unauthorized physical access attempt.

An optical electromagnetic radiation (EM) emitter and receiver are optically connected to the glass security layer. In normal operation, optical EM is emitted and is transmitted by the glass security layer and is received by the optical EM receiver. In an embodiment, the actual flux of the received optical EM at the optical EM receiver is compared against a predetermined reference flux (e.g. expected flux, etc.) of the received optical EM at the optical EM receiver. In another embodiment, the actual interference pattern of the received optical EM at the optical EM receiver is compared against a predetermined reference interference pattern (e.g. expected total internal reflection pattern of the optical EM being transmitted by the glass security layer) of the received optical EM at the optical EM receiver. For clarity, the term optical flux, or the like, referred to herein, is the radiant flux or luminous flux of the optical EM.

When the glass security layer is accessed (e.g., drilled, sawed, cut, etc.), the glass security layer fractures. The actual flux or interference pattern of the received optical EM at the optical EM receiver is resultantly altered. For example, the actual flux of the received optical EM at the optical EM receiver is less than the predetermined or expected flux or the actual interference pattern is compressed, skewed, etc. relative to the expected interference pattern.

An optical monitor device monitors the actual flux or actual interference pattern of the received optical EM at the optical EM receiver in relation to the reference flux or reference interference pattern respectively. The optical monitor device passes a tamper signal that is received by one or more computer system devices to respond to the unauthorized physical access of the glass security layer when the actual flux or actual interference pattern of the received optical EM at the optical EM receiver deviates from the reference flux or reference interference pattern by a predetermined threshold amount. The tamper signal may cause one or more cryptographic adapter card functions, computer system functions, or secured crypto components to be disabled.

Figure 1:
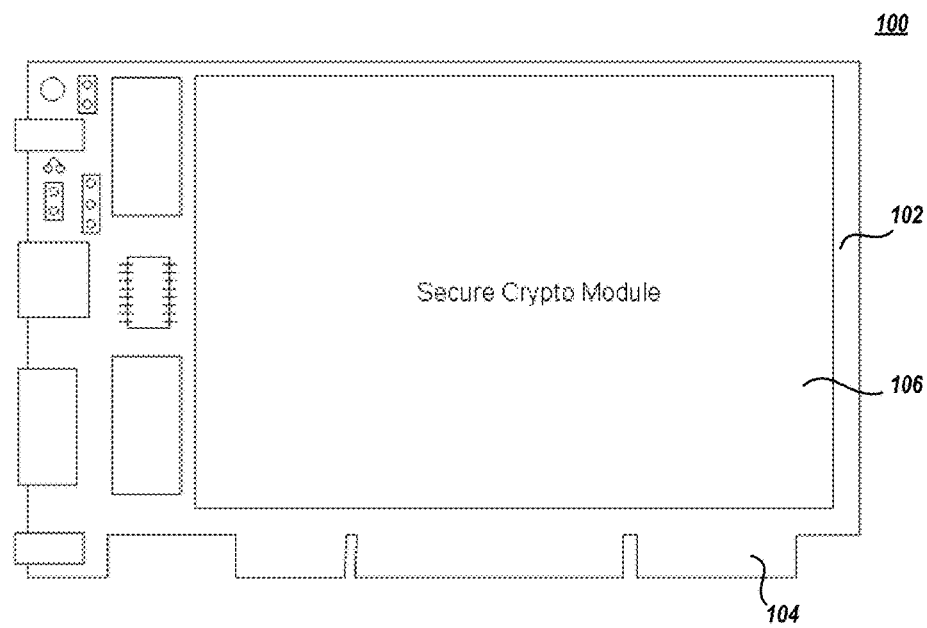
FIG. 1 illustrates an exemplary cryptographic adapter card including a secure crypto module that utilize various embodiments of the present invention.

Referring to the drawings, wherein like numbers denote like parts throughout the several views, FIG. 1 illustrates a cryptographic adapter card 100 which includes a secure crypto module 106. Cryptographic adapter card 100 includes a printed circuit board (PCB) 102 and connector 104 that can be inserted into an electrical connector, or expansion slot on a computer motherboard, backplane or riser to add cryptographic functionality to the computer via an expansion bus. PCB 102 provides mechanical support for various electronic components as well as electrically conductive pathways, also referred herein as traces, to provide for electrical communication (e.g., data transfer, etc.) as is known in the art. The computer motherboard, backplane or riser, hereinafter referred to as a motherboard, provides mechanical support for computer components such as a processor and memory and includes traces for electrical communication to and from the computer components, as is known in the art. The expansion bus, a particular mother board trace, is a computer bus which moves information between the internal hardware of the computer (e.g., the processor and memory) and peripheral devices.

Figure 2:
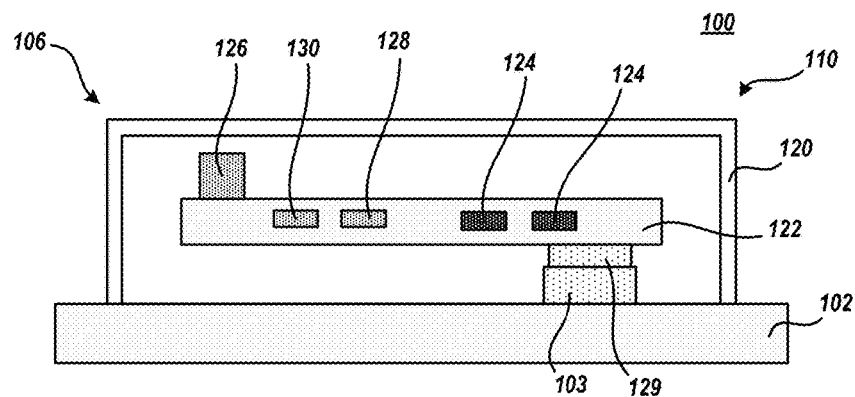
FIG. 2 illustrates an exemplary cross section of an exemplary cryptographic adapter card that includes a cryptographic printed circuit board (PCB) module, according to various embodiments of the present invention.

Secure crypto module 106 provides a complete envelope of protection around a cryptographic PCB module 110, exemplarily shown in FIG. 2, to detect and respond to unauthorized attempts at physical access or tampering therewith.

FIG. 2 illustrates an exemplary cross section of cryptographic adapter card 100. Secure crypto module 106 includes cryptographic PBC module 110 and may include a shield 120. Cryptographic module 110 is a collective set of hardware that physically resides upon or imbedded within daughter PCB 122 or is software, firmware, etc. called by that hardware that which implements cryptographic logic or cryptographic processes, including cryptographic algorithms. The cryptographic module 110 may be contained within a perimeter boundary or shield 120 of the secure crypto module 106.

As is further described herein, PCB 102 and/or daughter PCB 122 includes a glass security layer that detects unauthorized physical access attempts to the PCB. The glass security layer may be located in various locations within the PCB buildup or stack. For example, the glass security layer may be nearest the PCB upper surface and/or lower surface, or may alternatively be located within an internal layer or portion of the PCB. The glass security layer is generally an optical EM transmission medium in which optical EM transmission properties are altered upon the physical access thereof. Physical access of the glass security layer results in a predetermined threshold change in luminous flux received by an optical EM receiver attached to the glass security layer. The change in luminous flux may result in the zeroization of area(s) of the one or more crypto components 124 where sensitive data is stored (e.g. zeros are written to storage areas, storage areas are wiped, or the like), disabling of the one or more crypto components 124, etc.

Cryptographic module 110 includes a daughter PCB 122 and one or more crypto devices 124. Cryptographic module 110 may further include battery 126, enable device 128, connector 103, connector 129, and monitor device 130. Daughter PCB 122 provides mechanical support for crypto devices 124 and for battery 126, enable device 128, and monitor device 130, when included within cryptographic module 110. Daughter PCB 122 includes electrical traces therein that provide for the connection of one or more crypto devices 124 to other electrical devices upon the daughter PCB 122, upon PCB 102, and/or upon the computer system motherboard, etc. Connector 129 electrically connects the daughter PCB 122 to PCB 102 via PCB connector 103.

The various connectors and traces contemplated herein generally allow for crypto devices 124 to electrically communicate with one or more computer components of the motherboard. When cryptographic adapter card 100 is not connected to the motherboard (where electrical potential is provided therefrom), battery 126 provides electric potential to enable device 128 to program or enable a destruct feature within each crypto device 124. The battery 126 may further provide backup power to one or more features of the cryptographic module 110 and may be active from the time of factory initialization until the end of the cryptographic module 110 expected product life.

Crypto devices 124 are hardware computer components that implement cryptographic logic or cryptographic processes or otherwise store or handle cryptographic data. A non-exhaustive list of crypto devices 124 are a coprocessor, memory (DRAM, Flash, ROM, RAM, etc.), FPGA, surface mount component, pin-in-hole component, socketed component, a circuit, an integrated circuit, etc.

Shield 120 is an enclosure, chassis, envelope, or other perimeter shell that generally surrounds and protects the internal cryptographic module 110. Shield 120 may be absent of access or air flow cutouts to limit access to the internal cryptographic module 110. In some implementations where crypto component 124, battery 126, enable device 128, and/or monitor device 130 need cooling, a heat sink may be thermally attached to the hardware and the fins or pins of the heat sink may protrude through the shield 120. In an embodiment, shield 120 may surround the cryptographic module 110 on at least five sides, the sixth side of cryptographic module 110 being protected by the printed circuit board 102. In another embodiment, shield 120 may surround the cryptographic module 110 on all six sides of the cryptographic module 110 with the sixth side includes a cutout to allow the daughter PCB 122 to be electrically connected to PCB 102 via connectors 129, 103. In embodiments, the shield 120 may be formed from sheet metal. By surrounding the internal cryptographic module 110, shield 120 generally forms a layer of protection of the cryptographic module 110 by limiting physical penetration thereto.

Optical monitor device 130 is a device that monitors the actual flux or actual interference pattern of the received optical EM at the optical EM receiver in relation to the reference flux or reference interference pattern, respectively. The optical monitor device may include a register to store the reference value(s). Further optical monitor device 130 is a device that passes a tamper signal that is received by one or more computer system devices to respond to the unauthorized physical access of the glass security layer when the actual flux or actual interference pattern of the received optical EM at the optical EM receiver deviates from the reference flux or reference interference pattern by a predetermined threshold amount. Monitor device 130 may be an electrical component or circuit. In various embodiments, optical monitor device 130 may be an application specific integrated circuit (ASIC), field programmable gate array (FPGA), microchip, microcomputer, etc. The optical monitor device at least includes or is electrically connected to an optical EM receiver. Optical monitor device 130 may further include or further is electrically connected to an optical EM emitter.

For clarity, crypto component 124, battery 126, enable device 128, and/or monitor device 130 may be surface mount components, pin-in-hole components, socketed components, circuits, etc. that are located upon daughter PCB 122. Further, crypto component 124, battery 126, enable device 128, and/or monitor device 130 may alternatively be imbedded within daughter PCB 122. For example, optical monitor device 130 may be a chip, integrated circuit, etc. upon or within daughter PCB 122. Similarly, one or more of the crypto component 124, battery 126, enable device 128, and/or monitor device 130 located upon or within daughter PCB 122 may be physically located upon or imbedded within PCB 102. In a particular embodiment, the glass security layer and the optical monitor device 130 are located upon the top and bottom sides of the PCB and the crypto component 124, battery 126, enable device 128, etc. are located within the PCB portion. In this manner, the glass security layer may generally form a perimeter detection boundary that surrounds and detects physical access attempts of the PCB or PCB components, such as crypto component 124, battery 126, enable device 128, traces, etc. therewithin.

Figure 3:
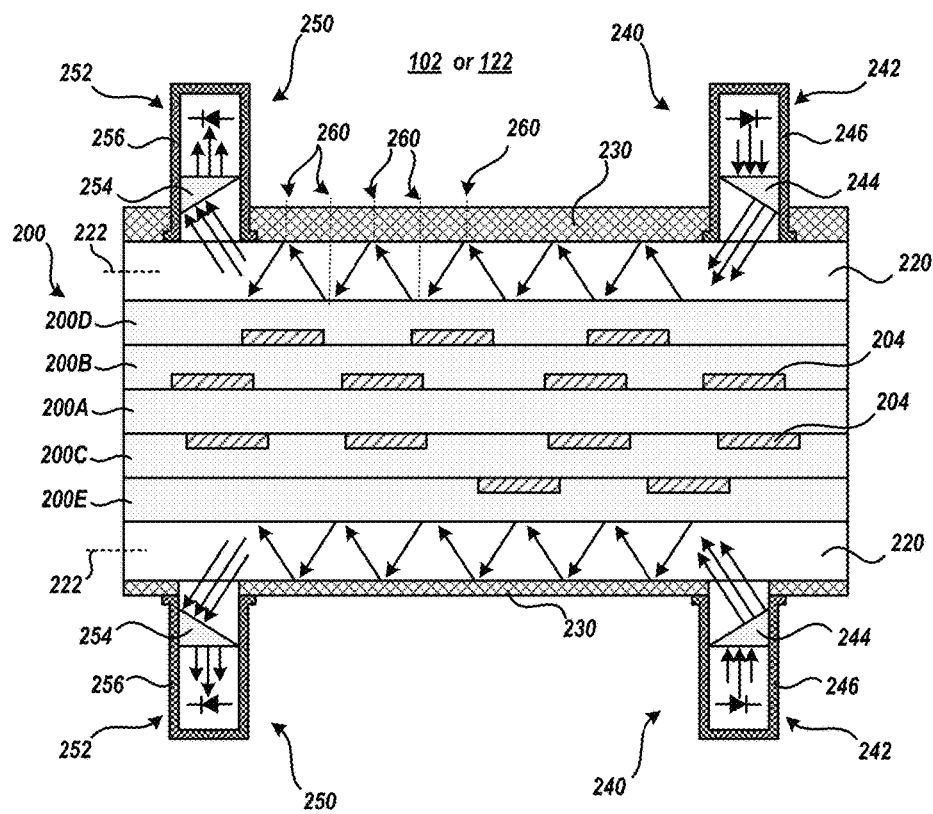
FIG. 3 illustrates an exemplary cross section view of a cryptographic adapter card PCB or a daughter PCB of the cryptographic PCB module, according to various embodiments of the present invention.

FIG. 3 illustrates an exemplary cross section view of cryptographic adapter card PCB 102 and/or daughter PCB 122 which includes one or more glass security layer 220, according to various embodiments of the present invention. In a particular implementation of the cryptographic adapter card 100, only the PCB 102 and not daughter PCB 122 includes one or more glass security layers 220. In another implementation of the cryptographic adapter card 100, only the daughter PCB 122 and not PCB 102 includes one or more glass security layers 220. In yet another implementation of the cryptographic adapter card 100, both the PCB 102 and daughter PCB 122 includes respective one or more glass security layers 220.

In a particular embodiment, as is shown in FIG. 3, a glass security layer 220 is formed upon wiring layer(s) 200 of the PCB layer or stack buildup. The wiring layer(s) 200 are the traditional wiring buildup of PCBs and may include conductive traces 204 formed upon one or more layers of dielectric substrate 201A-201E. The conductive traces 204 may be formed by subtractive fabrication techniques such as etching conductive sheets (copper, or the like) 204' (exemplarily shown in FIG. 4, etc.) laminated onto a dielectric substrate layer 201 (e.g. prepreg, FR4, etc.). The conductive traces 204 may alternatively be formed by positive fabrication techniques where conductive trace 204 is applied directly onto the dielectric substrate layer 201. For example, conductive trace 204 may be formed by plating, printing, etc. conductive material upon the dielectric substrate layer 201. The dielectric substrate layers 201 are usually dielectric composite materials that contain a matrix, e.g. an epoxy resin and a reinforcement, e.g., a woven, sometimes nonwoven, glass fabric.

The wiring layer 200 may be a single dielectric substrate layer 201 with conductive traces 204 formed upon the top surface and/or bottom surface thereof. The wiring layers 200 may include multiple dielectric substrate layers 201 with conductive traces 204 formed upon respective top surfaces and/or bottom surfaces. For example, conductive traces 204 are formed upon the top surface and bottom surface of dielectric substrate layer 201A. Dielectric substrate layer 201B is formed upon the upper surface of dielectric substrate layer 201A and upon associated conductive traces 204 by known fabrication techniques. Dielectric substrate layer 201C is formed upon the lower surface of dielectric substrate layer 201A and upon associated conductive traces 204 by known fabrication techniques. Conductive traces 204 may be formed upon the dielectric substrate layer 201B and dielectric substrate layer 201C. Similarly, additional layers (i.e. dielectric substrate layer 201D and dielectric substrate layer 201E) may be formed upon the dielectric substrate layer 201B and dielectric substrate layer 201C.

Conductive traces 204 located on different dielectric substrate layers 201 may be connected with plated-through hole vias, blind vias, buried vias, etc. Components such as capacitors, resistors, active devices, crypto component 124, battery 126, enable device 128, and/or monitor device 130 may be formed upon particular layers 201 within wiring layer(s) 200 and connected to particular conductive traces 204. Conductive traces 204 may be electrically connected to such components by known interconnection techniques and/or structures.

Glass security layer 220 is generally a tempered, or toughened, glass layer that remains intact in the absence of point force loading and fractures when a point load punctures or otherwise contacts the glass layer. For example, glass security layer 220 fractures when a point load intrudes into the glass security layer 220 by 0.004 inches or a hole of 0.004 inches in diameter intrudes into the glass security layer 220. For clarity, the 0.004 dimension is denoted as an exemplary dimension and it is to be understood that glass security layer 220 may fracture at greater or smaller dimensions when subjected to access thereof. The term fracture, or the like, utilized herein means that the glass security layer 220 shatters across at least the majority of the surface area thereof.

In an embodiment, one or more glass security layers 220 surround all sides of the PCB. For example, respective glass security layers 220 are located upon the top, bottom, front, rear, and side surfaces of daughter PCB 122 and/or PCB 102 and may fully encapsulate the crypto component 124, battery 126, enable device 128, monitor device 130, etc. In another embodiment, a glass security layer 220 may be located within wiring layer(s) 200. In other words, with respect to FIG. 3 as illustrated, a dielectric substrate layer 201 may be formed upon glass security layer 220 and traces 204 may be formed thereupon.

In the exemplary cross section depicted in FIG. 3, at least one glass security layer 220 is located on the perimeter of PCB 102 and/or daughter PCB 122. In other words, glass security layer 220 is formed upon the top and/or bottom surfaces of wiring layer(s) 200. In a particular fabrication, the glass security layer 220 may be laminated to wiring layer(s) 200 utilizing known epoxy systems used in existing PCB manufacturing. In a fabrication, glass security layer 220 is at least partially comprised of the same glass fibers used in conventional PCB dielectric substrate layers 201, conventional epoxy resins are bonding compatible with glass security layer 220. Alternatively, polyimide-based adhesive bonding films could be used to adhere glass security layer 220 with wiring layer(s) 200.

Glass security layer 220 also transfers, transmits, or the like optical EM (i.e., ultraviolet light, visible light, and infrared light) emitted from an optical EM emitter 240 to an optical EM receiver 250. In other words, glass security layer 220 is a medium for the transfer of optical EM. In an embodiment, glass security layer 220 is at least partially transparent (e.g. is translucent, etc.). For example, transparent dielectric layer 200 may be formed from a material that allows light to pass through the material without being scattered (i.e. transparent) or a material that allows a predetermined amount but less than all light to pass through the material (i.e. translucent).

The transmission of the optical EM via glass security layer 220 may also be referred to as guided wave transmission. The glass material of glass security layer 220 may be selected depending upon the known or expected optical EM wavelength of the emitted optical EM from emitter 240 transmitted by glass security layer 220.

Glass security layer 220 generally transmits optical EM along thickness bisector 222 by the process of total internal reflection. In regards to its optical properties, glass security layer 220 consists of a core surrounded by a cladding. To confine the optical EM in the core, the refractive index of the core is greater than that of the cladding. When optical EM traveling in glass security layer 220 hits the cladding at a steep angle, at boundary 260, the optical EM will be completely reflected and confined in the core. The optical EM travels along glass security layer 220 bouncing back and forth off of the boundary 260 generally in a reflection or interference pattern. Because the optical EM must strike the boundary 260 with an angle greater than the critical angle, optical EM that enters glass security layer 220 within a certain range of angles is propagated. This range of angles is the acceptance cone of glass security layer 220. The size of the acceptance cone is a function of the refractive index difference between the glass security layer 220 core and cladding.

Optical EM emitter 222 is a device that generally projects optical EM and optical EM receiver 224 is a device that generally detects optical EM. Optical EM emitter may include optical EM generation device 242, refractor 244, and enclosure 242. Optical EM receiver may include optical EM measurement device 252, refractor 254, and enclosure 252. The optical EM generation device 242 may be a laser, light emitting diode, or the like. The optical EM measurement device may be a photo diode, image sensor (e.g., complementary metal oxide semiconductor (CMOS) sensor, charge-coupled device (CCD) sensor), or the like. In an embodiment, optical EM measurement device 252 measures optical EM flux. In another embodiment, optical EM measurement device 252 captures optical images that depict the interference pattern of the optical EM. The optical images may be sampled at various time instances and compared to a reference interference pattern to determine a change in the interference pattern of the optical EM. In an embodiment, the captured interference pattern is overlaid with the reference pattern to create a moiré pattern that may be analyzed by the optical monitor device 130 to determine whether the captured interference pattern deviates from the reference interference pattern by the predetermined threshold amount.

Refractor 244 and refractor 254 generally redirects the path of optical EM. Refractor 244 and refractor 254 may be a prism or the like. In an embodiment, optical EM generation device 242 emits optical EM in a direction generally perpendicular to glass security layer 220. Refractor 244 changes the path of the emitted optical EM into the acceptance cone of glass security layer 220. Similarly, refractor 254 changes the path of received optical EM to be generally perpendicular to glass security layer 220 so as to be received by optical EM measurement component 258.

The optical EM emitter 240 and optical EM receiver 250 are located upon glass security layer 220 such that the optical EM emitted from emitter 240 is transferred to the glass security layer 220, is transmitted by the glass security layer 220, and is transferred to the optical EM receiver 250.

An encapsulation layer 230 may be formed upon the glass security layer 220. In an embodiment, as is exemplary shown on the bottom side of the PCB shown in FIG. 3, the encapsulation layer 230 may be formed upon the glass security layer 220 before optical EM emitter 240 and optical EM receiver 250 are located upon glass security layer 220. Openings in the encapsulation layer 230 are formed and optical EM emitter 240 and optical EM receiver 250 are positioned within respective openings upon glass security layer 220. In another embodiment, as is exemplary shown on the upper side of the PCB shown in FIG. 3, the encapsulation layer 230 may be formed upon the glass security layer 220 subsequent to EM emitter 240 and optical EM receiver 250 being located upon glass security layer 220.

The encapsulation layer 230 may be formed to a thickness greater than the height of optical EM emitter 240 and/or optical EM receiver 250. In other words, encapsulation layer 230 generally has a thickness greater than the height of PCB 102, 122 surface features. In some instances, encapsulation layer 230 may be a known resin that is a conforming material coated upon an outer PCB layer that conforms to the contours of the PCB. As is known in the art, the resin may be visually opaque. The encapsulation layer 230 may generally protect the underlying layers or components against moisture, dust, chemicals, and temperature extremes that, if uncoated (non-protected), could result in damage or failure of the electronics mounted upon or imbedded within wiring layer(s) 200 to function. The encapsulation layer 230 may be formed from by known fabrication techniques and may be formed from an epoxy, polyurethane, resin, silicon, or the like.

In an embodiment, at least the optical EM receiver 250 is connected to optical monitor device 130. In another embodiment, the optical EM receiver 250 and optical EM emitter 240 are connected to optical monitor device 130. Optical monitor device 130 monitors the actual flux or actual interference pattern of the received optical EM at the optical EM receiver 250 in relation to the reference flux or the reference interference pattern, respectively. The optical monitor device 130 may include a register to store the reference value(s). In an embodiment, the EM flux is altered because of a physical access or penetration of the glass security layer 220 causing the glass security layer 220 to fracture. In another embodiment, the actual interface pattern is altered relative to the reference interference pattern because of a physical access or penetration of the glass security layer 220 causing the glass security layer 220 to fracture, because environmental changes, such as a change in temperature of the glass security layer.

Further, optical monitor device 130 passes a tamper signal that is received by one or more computer system devices to respond to the unauthorized physical access of the glass security layer 220 when the actual flux of the received optical EM at the optical EM receiver 250 deviates from the reference flux or reference interference pattern by a predetermined threshold amount.

Figure 4:
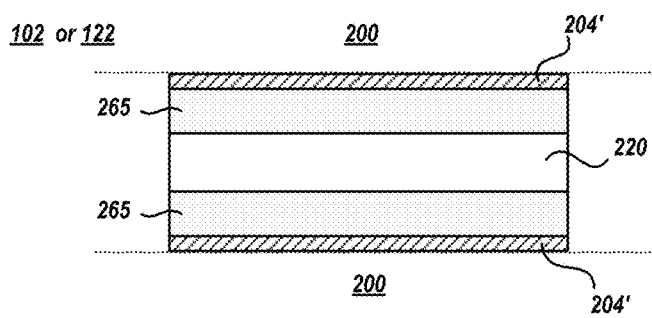
FIG. 4 illustrates an exemplary cross section view of a cryptographic adapter card PCB or a daughter PCB of the cryptographic PCB module, according to various embodiments of the present invention.

FIG. 4 illustrates an exemplary cross section view of cryptographic adapter card PCB 102 and/or daughter PCB 122 which includes one or more glass security layer 220, according to various embodiments of the present invention. As it is known, that there are numerous layers which makeup or form a PCB, there are numerous particular PCB layers on which glass security layer 220 may be formed. Further, there are numerous particular PCB layers which may be formed upon glass security layer 220. FIG. 4 generally depicts an alternative fabrication of cryptographic adapter card PCB 102 and/or daughter PCB 122.

The section of the PCB shown in FIG. 4 may be formed by initially providing glass security layer 220. Dielectric substrate layer 265 is then formed upon the top surface and/or the bottom surface of glass security layer 220. Dielectric substrate layer 265 is generally the same material as dielectric substrate layer 201 utilized to form wiring layer(s) 200. Subsequently, conductive sheet 204' is then formed upon the dielectric substrate layer 265. The conductive sheet 204' and dielectric substrate layer 265 may be opened (forming openings 267, exemplary shown in FIG. 5) to remove conductive sheet 204' and dielectric substrate layer 265 material to expose the glass security layer 220 upon which the EM receiver 250 and optical EM emitter 240 are joined. For example, the conductive sheet 204' may be drilled and the underlying dielectric substrate layer 265 may be etched. Alternatively, the openings 267 may be formed in conductive sheet 204' and dielectric substrate layer 265 prior to joining such layers to glass security layer 220. The section of the PCB shown in FIG. 4 may formed, joined, laminated, bonded, etc. upon the top surface and/or bottom surface of wiring layer(s) 200.

Figure 5:
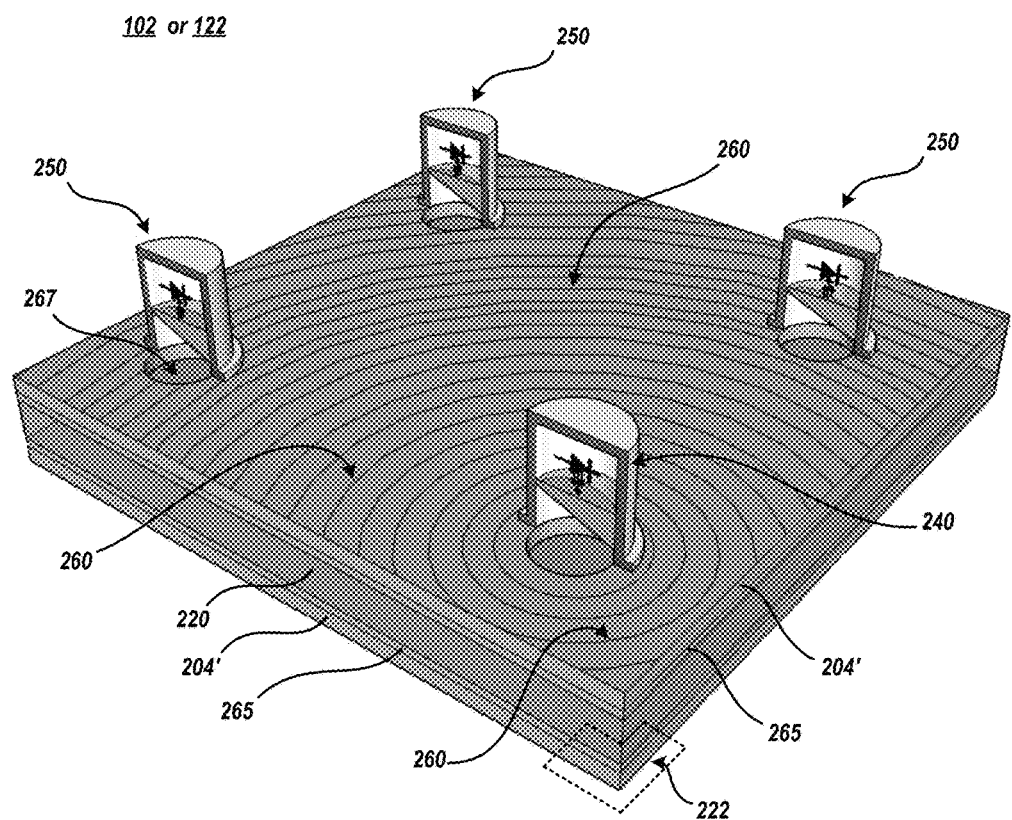
FIG. 5 illustrates an exemplary isometric view of a cryptographic adapter card PCB or a daughter PCB of the cryptographic PCB module, according to various embodiments of the present invention.

FIG. 5 illustrates an exemplary isometric view of a cryptographic adapter card PCB 102 and/or daughter PCB 122, according to various embodiments of the present invention. More specifically, FIG. 5 depicts the transmission pattern of optical EM transmitted by the glass security layer 220 from optical EM emitter 240 to optical EM receiver 250. In an embodiment, a single optical EM emitter 240 is central to multiple optical EM receivers 250 located upon glass security layer 220. In an embodiment, glass security layer 220 generally transmits optical EM in three hundred sixty degrees about optical EM emitter 240 along thickness bisector 222 by the process of total internal reflection. When optical EM traveling in glass security layer 220 hits the cladding at a steep angle, at boundary 260, the optical EM will be completely reflected and confined in the core. For clarity, in FIG. 5, such reflection of optical EM transmitted and reflected at boundary 260 generally forms the interference pattern of transmitted optical EM transmitted by the glass security layer 220 in three hundred sixty degrees about optical EM emitter 240 is generally projected upon conductive sheet 204', though the reflection of the optical EM is fully contained within glass security layer 220.

In an embodiment, the optical EM receiver 250 solely detects the interference pattern of the optical EM reflecting at boundaries 260 transmitted by glass security layer 220. In another embodiment, the optical EM receiver 250 detects both the interference pattern of the optical EM reflecting at boundaries 260 and the flux of the optical EM transmitted by glass security layer 220.

Figure 6:
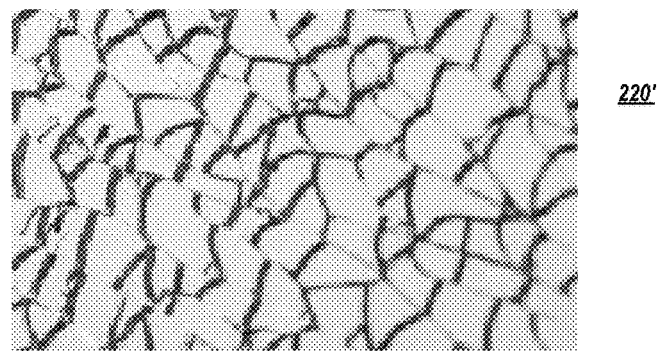
FIG. 6 illustrates an exemplary view of a glass security layer subsequent to physical access thereof, according to various embodiments of the present invention.

FIG. 6 illustrates an exemplary view of a glass security layer 220 subsequent to physical access thereof, hereinafter referred as glass security layer 220', according to various embodiments of the present invention.

Glass security layer 220 is a layer of tempered glass, or also known in the art as toughened glass. As such, glass security layer 220 outer surfaces are in compression and glass security layer 220 inner portions between the outer surfaces are in tension. For example, the cladding of glass security layer 220 is in compression and the core of the glass security layer 220 is in tension. Such stresses cause the glass security layer 220, when accessed, to shatter or break into thumbnail sized sections. The greater the surface stress, the smaller the glass sections will be when fractured. Because of the stresses in the glass security layer 220, damage to any portion will eventually result in the majority area of glass security layer 220 shattering into thumbnail-sized (or smaller) sections. For example, at least the majority of glass security layer 220 area shatters into sections when a point load intrudes into the glass security layer 220 by 0.004 inches or when a hole of 0.004 inches in diameter intrudes into the glass security layer 220. For clarity, the 0.004 dimension is denoted as an exemplary dimension and it is to be understood that glass security layer 220 may fracture at greater or smaller dimensions when subjected to access thereof. The unauthorized physical access attempt to access glass security layer 220 by a drill, or other point load, saw, etc. may generally be the cause of fracture of glass security layer 220. A benefit to utilizing tempered glass as the glass security layer 220 is high internal reflection properties of tempered glass—the surface stresses of the glass security layer 220 form an efficient internal reflection cladding such that optical EM is efficiently transferred in the internal portion.

An exemplary depiction of fractured glass security layer 220' shown in FIG. 6 which depicts the entire surface area of glass security layer 220 being fractured into sections. This means that the fractured glass security layer 220' consists of adjacent sections that are physically separated and may be or may not be in physical contact across the surface area of fractured glass security layer 220'. Such separation of adjacent sections form fracture lines 270, exemplary shown in FIG. 7, that bound each fractured section. The fracture lines 270 may extend from the top surface of the glass security layer to the bottom surface of glass security layer. Alternatively, the fracture lines 270 may partially extend from the top surface or bottom surface into the glass security layer.

Figure 7:
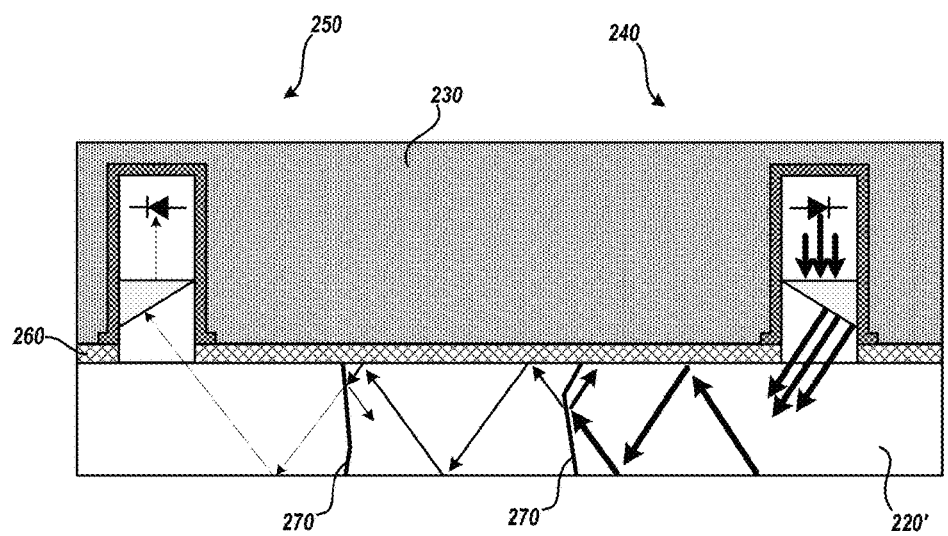
FIG. 7 illustrates an exemplary cross section view of a cryptographic adapter card PCB or a daughter PCB of the cryptographic PCB module subsequent to physical access of a glass security layer, according to various embodiments of the present invention.

FIG. 7 illustrates an exemplary cross section view of cryptographic adapter card PCB 102 and/or daughter PCB 122 which include fractured glass security layer 220', according to various embodiments of the present invention. The fracture of the glass security layer generally reduces the total optical EM transferred by the glass security layer from the optical EM emitter 240 to the optical EM receiver 250. For example, when optical EM contacts a fracture line 270, a portion of the optical EM is reflected back into the section that is bounded by that fracture line 270 and another portion of the optical EM continues along the transmission path into the next adjacent section. At each fracture line 270 intersection the flux of the optical EM may be reduced relative to the flux of the optical EM prior to the fracture line 270 intersection. As such, the flux of the optical EM at the location of and received by optical EM receiver 250 is generally less than the flux of the optical EM emitted by optical EM emitter 240. This reduction of optical EM received by optical EM receiver 240, relative the optical EM received by optical EM receiver 240 prior to the fracture of the glass security layer, is detected and generally triggers predetermined system faults or self-destruct function(s) to protect against unauthorized access of cryptographic data or unauthorized determination of cryptographic functionality.

Figure 8:
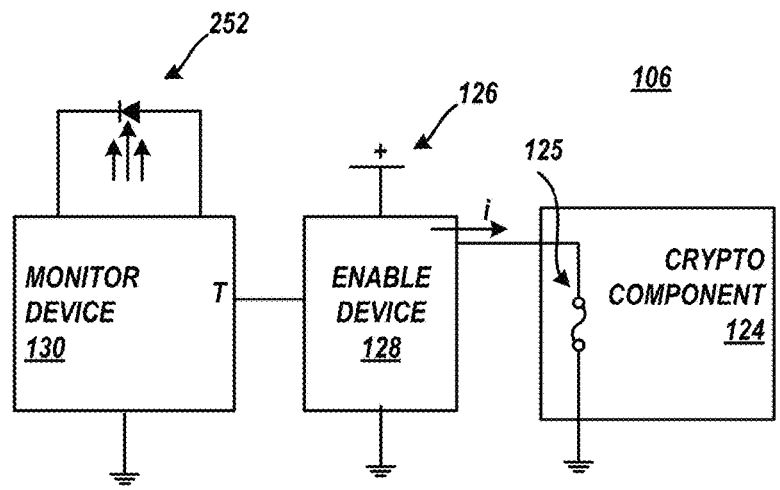
FIG. 8 illustrates an exemplary block circuit diagram of a cryptographic adapter card PCB and/or a daughter PCB of the cryptographic PCB module, according to various embodiments of the present invention.

FIG. 8 illustrates an exemplary block circuit diagram of secure crypto module 106 that utilizes various embodiments of the present invention. Optical monitor device 130 at least includes or is electrically connected to optical EM receiver 250. For example, optical monitor device 130 is electrically connected to optical EM measurement device 252.

Optical monitor device 130 may further include or is further electrically connected to optical EM emitter 240 (not shown). For example, optical monitor device 130 is electrically connected to optical EM generation device 242. When the optical monitor device 130 is associated with the optical EM emitter 240, the optical monitor device 130 may determine the reference flux since the optical monitor device 130 may know, control, manage, etc. the optical EM emitted by optical EM emitter 240.

Further, monitor device 130 is communicatively connected to enable device 128 in that it may communicate a tamper signal from monitor device 130 to enable device 128. Monitor device 130 is an electrical component or circuit (e.g., integrated circuit, chip, FPGA, etc.) that monitors the actual flux or actual interference pattern of the received optical EM at the optical EM receiver 250 in relation to the reference flux or reference interference pattern respectfully.

The optical monitor device 130 may include a register or internal storage area to store the reference values. The optical monitor device 130 passes a tamper signal (e.g. signal "T", etc.) that is received by one or more computer system devices to respond to the unauthorized physical access of the glass security layer 220 when the actual flux of the received optical EM at the optical EM receiver 250 deviates from the reference flux or reference interference pattern by a predetermined threshold amount.

Optical monitor device 130 continuously, periodically, etc. determines whether the optical EM flux or interference pattern received at optical EM receiver 224 is the expected reference EM flux or reference interference pattern or falls within a predetermined acceptable range similar to the expected reference EM flux or reference interference pattern. For example, optical monitor device 130 compares the actual received EM flux to the predetermined reference EM flux or optical monitor device 130 compares the actual received EM interference pattern to the predetermined reference interference pattern.

When the actual received EM flux is less than the predetermined expected EM flux or when actual received interference pattern is different relative to the predetermined expected EM interference pattern, optical monitor device 130 may generate and send an enable signal to an intermediary device, such as enable device 128 or directly to crypto component 124. For example, a default signal generated and sent from monitor device 130 to enable device 128 may be a low "0" signal. Upon the monitor device 130 detecting the received EM flux is less than the expected received EM flux, the enable signal is generated and sent from monitor device 130 to enable device 128 as a high "1" signal indicating that the glass security layer has been accessed.

Enable device 128 has or is connected to electrical potential and connected to a destruct feature 125 within crypto component 124. The electrical potential may be the power supply of cryptographic adapter card PCB 122 or motherboard PCB 102 if the system is in operation. If the system is non-operational or the system power supply is unavailable, the electrical potential is battery 126. Upon receipt of the enable signal, enable device 128 directs current to destruct feature 125 thereby programming the destruct feature 125. In a particular embodiment, destruct feature 125 may be a fuse or other one time programmable logic device. The programming of the destruct feature 125 may result in zeroization of area(s) of the one or more crypto components 124 where sensitive data is stored, disables the crypto component 124, etc.

Figure 9:
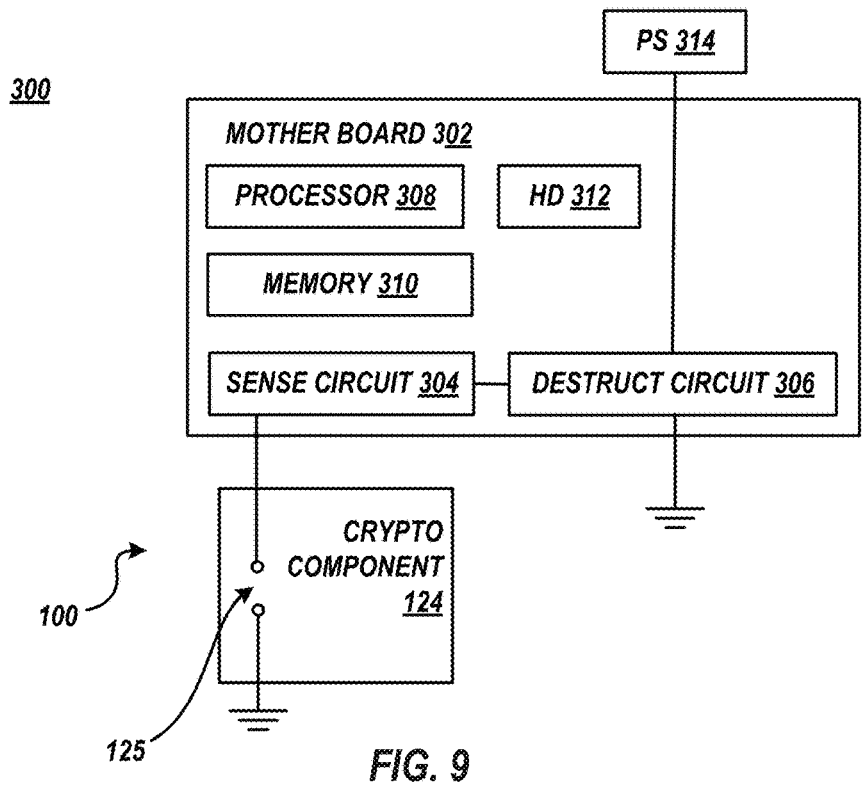
FIG. 9 illustrates a block diagram of an exemplary computer including a cryptographic adapter card PCB and/or a daughter PCB of the cryptographic PCB module, according to various embodiments of the present invention.

FIG. 9 illustrates of block diagram of a computer 300 including a cryptographic adapter card 100 that utilizes various embodiments of the present invention. In addition to computer devices such as memory 310, processor 308, etc., the computer motherboard 302 also includes a sense circuit 304 and a destruct circuit 306. The sense circuit 304 senses, monitors, or otherwise detects that destruct feature 125 has been programmed within one or more crypto components 124. Destruct circuit 306 is connected to a power supply 314, such as the power supply of computer 300. Upon sense circuit 304 determining destruct feature 125 within one or more crypto components 124 has been programmed, destruct circuit 306 zeros area(s) of the computer 300 where sensitive data is stored (e.g., a hard drive 312, memory 310, etc.) and/or one or more functions of the computer 300 are permanently disabled. For example, the processor 308 or memory 310 may be disabled; an application program interface associated with crypto functions of secure crypto module 106 may be disabled, a data bus for communicating data between the processor 308 and the cryptographic adapter card 100 may be disabled, etc.

Figure 10:
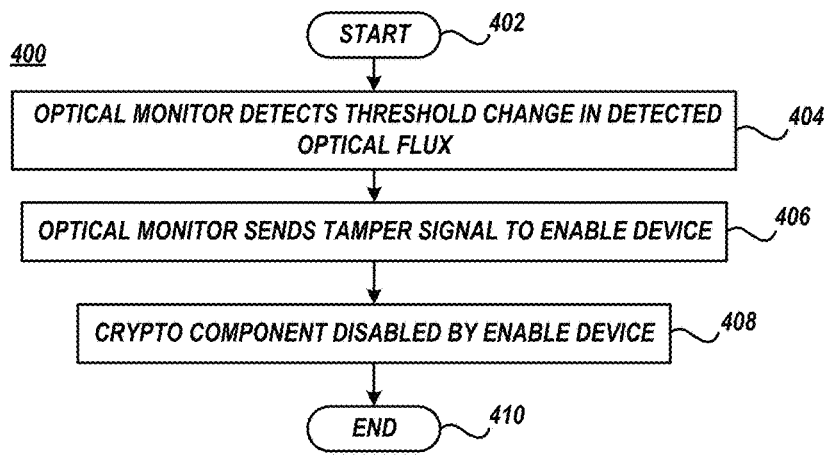
FIG. 10 and FIG. 11 illustrate exemplary methods of detecting and responding to an unauthorized physical access of a glass security layer, according to various embodiments of the present invention.

FIG. 10 illustrates an exemplary method 400 of detecting and responding to an unauthorized attempt of physical access of a PCB 102/and or PCB 122 that includes a glass security layer 220, according to various embodiments of the present invention. Method 400 may be utilized by a cryptographic adapter card 100 that includes secure crypto module 106, crypto component 124, optical monitor device 130, and a glass security layer 220.

Method 400 begins at block 402 and continues by optical monitor device 130 detecting that optical EM receiver 250 has actually received or detected a EM flux of received optical EM transmitted by the glass security layer that is less than the predetermined expected or reference EM flux or reference interference pattern by a predetermined threshold amount (block 404) which indicates that the glass security layer 220 has been accessed.

Method 400 may continue with the optical monitor device 130 sending a tamper signal to enable device 128 (block 406). For example, the optical monitor device 130 sends a high "1" tamper or enable signal to enable device 128 to generally instruct enable device 128 to program a destruct feature 125 within crypto component 124.

Method 400 may continue with crypto component 124 being disabled by the enable device 128 (block 408). For example, the programming of destruct feature 125 results in zeroization of area(s) of the one or more crypto components 124 where sensitive data is stored, renders the crypto component 124 inoperable, causes the crypto component 124 to perform spoof functions, causes the crypto component 124 to perform self-destruct functions, the activating of a tamper bit/byte within a crypto component 124 register, etc. Method 400 ends at block 410.

Figure 11:
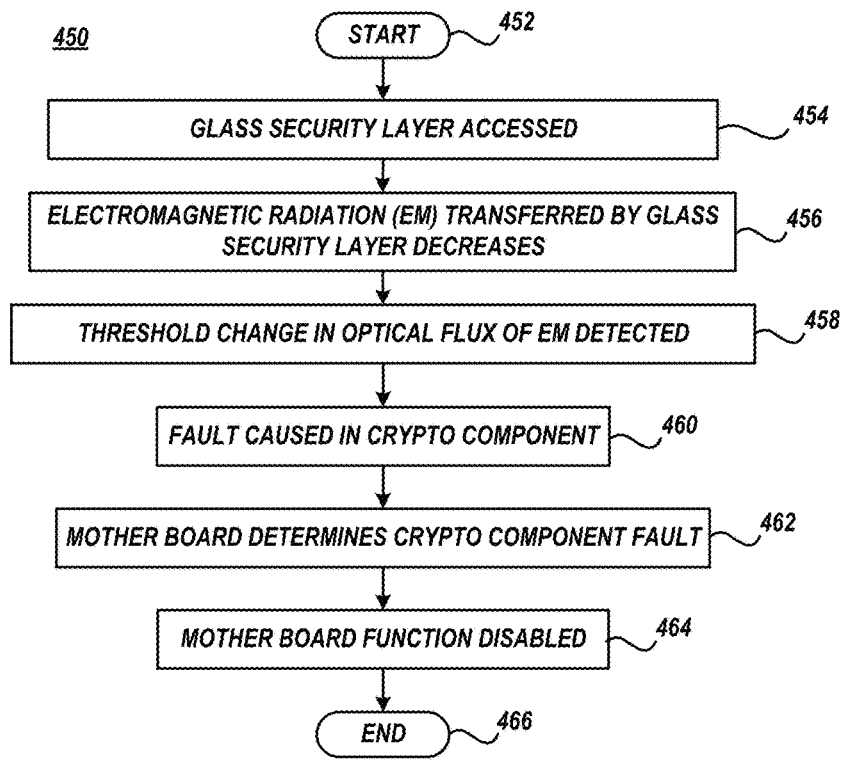

FIG. 11 illustrates an exemplary method 450 of detecting and responding to an unauthorized attempt of physical access of a PCB 102/and or PCB 122 that includes a glass security layer 220, according to various embodiments of the present invention. Method 450 may be utilized by a computer 300 that includes a motherboard 302 that includes a sense circuit 304, and a destruct circuit 306, and a cryptographic adapter card 100 connected thereto. The cryptographic adapter card 100 includes a secure crypto module 106, crypto component 124, optical monitor device 130, and a glass security layer 220.

Method 450 begins at block 452 and continues with the glass security layer 200 being accessed (block 454). For example, a point load, a drill, saw, etc. penetrates the boundary of the upper or lower surface of the glass security layer 200 as a result of an unauthorized physical access of the PCB. For example, hole of 0.004 inches in diameter is drilled into the glass security layer 220, etc.

Method 450 may continue with the optical EM transferred by the glass security layer 220 from the optical EM emitter 240 to the optical EM receiver 250 decreasing (block 456). For example, a first glass security layer 220 section transfers optical EM there across having a first optical flux and an adjacent second glass security layer 220 section separated from the first section by a fracture line(s) 270 transfers optical EM there across having a second optical flux less than the first optical flux as a result of some optical EM not being transferred from the first section to the second section but being reflected back into the first section.

Method 450 may continue with monitor device 130 detecting a predetermined threshold amount of optical flux reduction (block 458) which indicates that glass security layer 220 has been accessed. For example, the monitor device 130 compares the flux or pattern of the actually received optical EM flux against the predetermined reference flux or reference interference pattern stored therein. Alternatively, the monitor device 130 may determine the predetermined flux value by monitoring the flux of the optical EM emitted by the optical EM emitter.

Method 450 may continue with causing a fault in crypto component 124 (block 460). The fault may be generally the result of the programming of destruct feature 125 within crypto component 124. For example, the fault of crypto component 124 may result in zeroization of area(s) of the one or more crypto components 124 where sensitive data is stored, renders the crypto component 124 inoperable, causes the crypto component 124 to perform spoof functions, causes the crypto component 124 to perform self-destruct functions, causes the activation of a tamper bit/byte within a crypto component 124 register, etc. In an embodiment, the monitor device 130 may directly cause the fault in crypto component 124 (i.e. there are no intermediary devices between monitor device and crypto component 124) and in other embodiments, the monitor device 130 may indirectly cause the fault in crypto component (i.e. an intermediary device, such as enable device 128, causes the fault in crypto component as a result of receiving an instruction by monitor device 130).

Method 450 may continue with motherboard 302 determining that the crypto component 124 has faulted (block 462). The motherboard 302 sense circuit 304 determines, monitors, or otherwise detects that destruct feature 125 has been programmed causing the fault of crypto component 124.

Method 450 may continue with disabling functionality provided by motherboard 302 (block 464). The disabling of functionality is generally the result of detecting the programming of destruct feature 125 within crypto component 124. For example, the fault of crypto component 124 may result in zeroization of area(s) of memory 310, processor 308, hard drive 312, etc. where sensitive data is stored, renders the memory 310, processor 308, etc. inoperable, causes the memory 310, processor 308, etc. to perform spoof functions, causes the memory 310, processor 308, etc. to perform self-destruct functions, etc. Method 450 ends at block 466.

Figure 12:
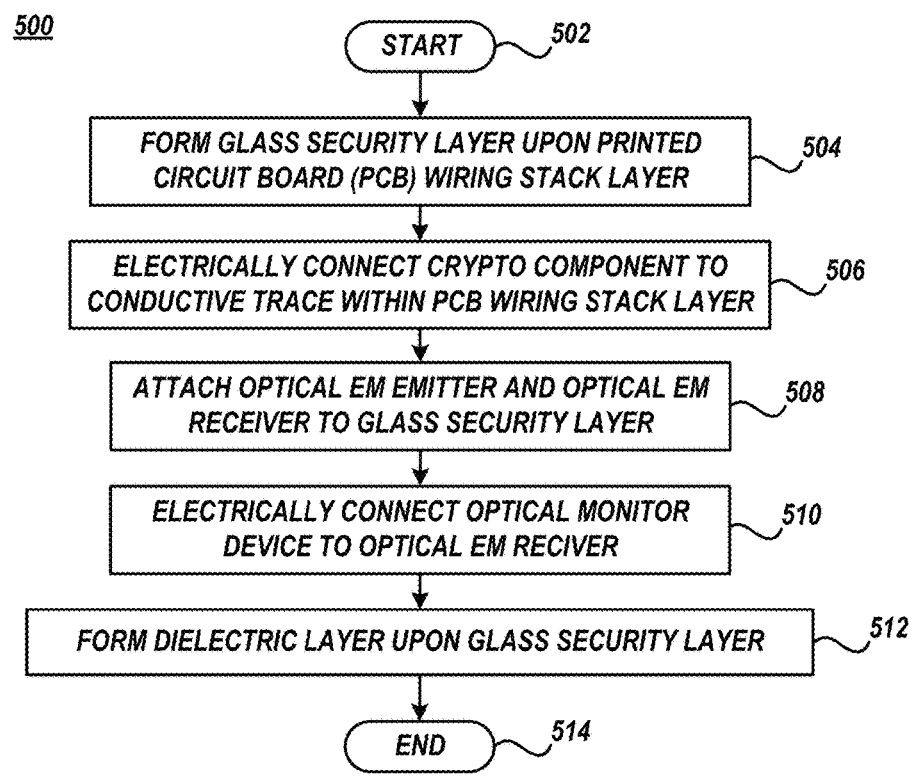
FIG. 12 illustrates an exemplary method of fabricating a cryptographic adapter card PCB or daughter PCB including a glass security layer, according to various embodiments of the present invention.

FIG. 12 illustrates an exemplary method 500 of fabricating a PCB including a secure crypto module 106, crypto component 124, optical monitor device 130, and a glass security layer 220. For example, method 500 may be utilized to fabricate adapter card PCB 102 and/or daughter PCB 122.

Method 500 begins at block 502 and continues with forming the glass security layer 220 upon a PCB wiring layer(s) 200 (block 504). The wiring layer(s) 200 may include one or more wiring dielectric layers 201 and conductive traces 204 formed thereupon.

Method 500 may continue with electrically connecting crypto component 124 to a conductive trace 204 located within the wiring layer(s) 200 (block 506). Method 500 may continue with attaching optical EM emitter 240 and optical EM receiver 250 to the glass security layer 220 (block 508). For example, the EM emitter 240 and EM receiver 250 are positioned against the glass security layer such that optical EM emitted from the EM emitter 240 is directed within the acceptance cone of glass security layer 220 and the optical EM exiting the glass security layer 220 is received by the optical EM receiver 250, etc.

Method 500 may continue with electrically connecting optical monitor device 130 to at least the optical EM receiver 250 (block 510). For example, optical monitor device 130 is electrically connected to optical EM measurement device 252. In another embodiment, the optical monitor device 130 is further electrically connected to the optical EM emitter 240. For example, optical monitor device 130 is electrically connected to optical EM generation device 242.

Method 500 may continue by forming a dielectric layer upon the glass security layer 220 (block 512). For example, an encapsulation layer 230 may be formed upon the glass security layer 220 to a thickness greater than the height of optical EM emitter 240 and/or optical EM receiver 250. Method 500 ends at block 514.

Figure 13:
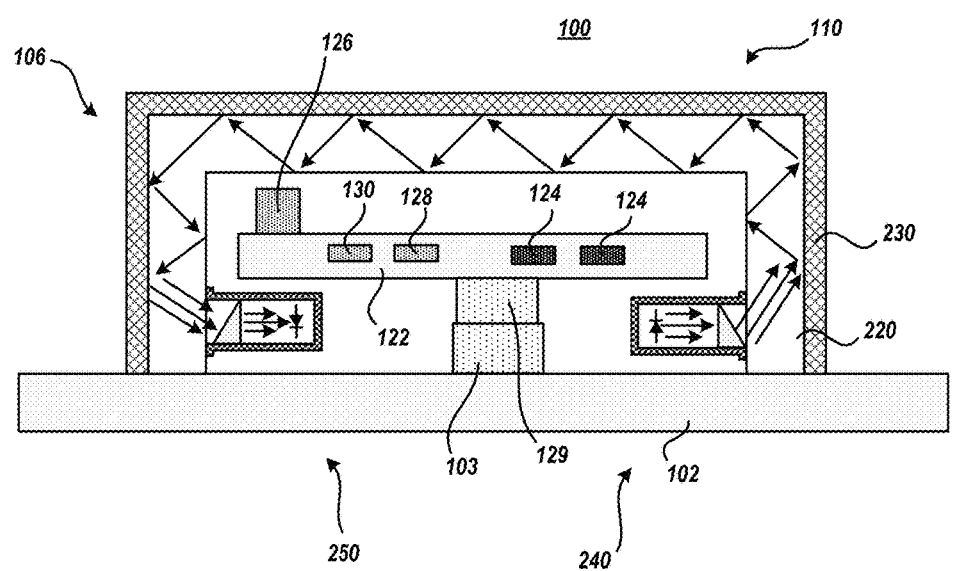
FIG. 13 illustrates an exemplary cross section of an exemplary cryptographic adapter card that includes a cryptographic printed circuit board (PCB) module, according to various embodiments of the present invention.

FIG. 13 illustrates an exemplary cross section of an exemplary cryptographic adapter card 102 that includes cryptographic PCB module 110. In the depicted embodiment, the cryptographic PCB module 110 is surrounded, partially surrounded, etc. by glass security layer 220. In the depicted embodiment, glass security layer 220 forms an envelope, or other perimeter shell that generally surrounds and protects the cryptographic module 110 internal thereto.

In an embodiment, glass security layer 220 may surround the cryptographic module 110 on at least five sides, the sixth side of cryptographic module 110 being protected by the adapter PCB 102 witch would include another instance of glass security layer 220. In another embodiment, glass security layer 220 may surround the cryptographic module 110 on all six sides of the cryptographic module 110 with the sixth side includes a cutout to allow the daughter PCB 122 to be electrically connected to PCB 102 via connectors 129, 103. By surrounding the internal cryptographic module 110, glass security layer 220 generally forms a layer of protection of the cryptographic module 110 by detecting physical penetration or environmental changes. In the present embodiment, optical EM emitter 240 and/or optical EM receiver 250 may be electrically connected to the optical monitor device 130 by wiring, electrical connectors, or by other known interconnection technologies.

Embodiments of the present invention may be a system, a method, and/or a computer program product. The computer program product may include a computer readable storage medium (or media) having computer readable program instructions thereon for causing a processor to carry out aspects of the present invention. The computer readable storage medium is a tangible device that can retain and store instructions for use by an instruction execution device. The computer readable storage medium may be, for example, but is not limited to, an electronic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method of fabricating a printed circuit board (PCB) comprising a glass security layer, the method comprising:
    forming the glass security layer upon a PCB wiring layer;
    optically attaching an optical electromagnetic radiation (EM) emitter upon the glass security layer;
    optically attaching an optical EM receiver upon the glass security layer;
    electrically connecting an optical monitor device to the optical EM receiver;
    electrically connecting the optical monitor device to a destruct feature within the crypto component, wherein the destruct feature is programmed when the optical EM receiver detects that an interference pattern of optical EM emitted from the optical EM emitter and transmitted by the glass security layer is different from a predetermined expected optical EM interference pattern.

2. The method of claim 1, further comprising:
    forming an optically opaque encapsulation layer upon the glass security layer, upon the optical EM emitter, and upon the optical EM receiver.

3. The method of claim 1, further comprising:
    electrically connecting the optical monitor device to the optical EM emitter.

4. The method of claim 2, wherein the optically opaque encapsulation layer is formed to a thickness greater than respective heights of the optical EM emitter and the optical EM receiver.

5. The method of claim 1, further comprising:
    electrically attaching a crypto component to a wire of the PCB.

6. The method of claim 1, wherein the destruct feature is programmed when the optical EM receiver detects a predetermined threshold decrease of optical flux of optical EM transmitted from the optical EM emitter to the optical EM receiver by the glass security layer.

* * * * *